(12) United States Patent
Aepli et al.

(10) Patent No.: US 9,644,081 B2
(45) Date of Patent: May 9, 2017

(54) POLYAMIDE MOULDING COMPOSITION, MOULDED ARTICLES PRODUCED THEREFROM AND ALSO USE OF THE POLYAMIDE MOULDING COMPOSITIONS

(71) Applicant: EMS-PATENT AG, Domat/Ems (CH)

(72) Inventors: Etienne Aepli, Domat/Ems (CH); Botho Hoffmann, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 25 days.

(21) Appl. No.: 14/663,105

(22) Filed: Mar. 19, 2015

(65) Prior Publication Data
US 2015/0284531 A1 Oct. 8, 2015

(30) Foreign Application Priority Data
Apr. 2, 2014 (EP) .................... 14163210

(51) Int. Cl.
| | | |
|---|---|---|
| C08L 77/00 | (2006.01) | |
| C08L 77/06 | (2006.01) | |
| C08K 5/20 | (2006.01) | |
| C08K 5/3492 | (2006.01) | |
| C08K 5/00 | (2006.01) | |

(52) U.S. Cl.
CPC ............ C08K 5/005 (2013.01); C08K 5/20 (2013.01); C08K 5/3492 (2013.01)

(58) Field of Classification Search
CPC ......... C08L 77/00; C08L 77/06; C08G 69/26; C08G 69/265; C08K 5/3492
See application file for complete search history.

(56) References Cited

U.S. PATENT DOCUMENTS

| | | | | |
|---|---|---|---|---|
| 6,706,790 B1 * | 3/2004 | Berliet | ............ | C08K 3/04 524/252 |
| 6,916,867 B2 * | 7/2005 | Gugumus | ............ | C08K 5/132 524/100 |
| 8,138,243 B2 | 3/2012 | Bühler et al. | | |
| 2001/0039304 A1 * | 11/2001 | Gugumus | ............ | C08K 5/132 524/100 |
| 2007/0161741 A1 * | 7/2007 | Ogasawara | ............ | C08K 5/005 524/494 |
| 2009/0085019 A1 | 4/2009 | Buhler et al. | | |
| 2010/0022742 A1 | 1/2010 | Bühler et al. | | |

FOREIGN PATENT DOCUMENTS

| | | | | |
|---|---|---|---|---|
| EP | 1 992 659 A1 | 11/2008 | | |
| FR | WO 9628503 A1 * | 9/1996 | ............ | C08K 3/04 |
| JP | 2010189467 A * | 9/2010 | | |
| WO | WO 2004000921 A1 * | 12/2003 | ............ | C08K 5/098 |
| WO | WO 2007/087896 A1 | 8/2007 | | |

OTHER PUBLICATIONS

Clariant (Hostavin VSU. Clariant. Jun. 2011, 2 pages).*
Machine translated English language equivalent of JP 2010-189467 (Sep. 2010, 9 pages).*

* cited by examiner

*Primary Examiner* — Brieann R Fink
(74) *Attorney, Agent, or Firm* — Leydig, Voit & Mayer, Ltd.

(57) ABSTRACT

The invention relates to a polyamide molding composition which comprises a partially aromatic polyamide and also a mixture of at least two UV absorbers. The invention likewise relates to molded articles which comprise corresponding polyamide molding compositions. The polyamide molding compositions according to the invention are used as parts of electrical or electronic components or housings or housing components, in particular housings or housing parts for portable electronic devices, household appliances, household machines, devices and apparatus for telecommunication and consumer electronics, interior and exterior parts in the automobile sector and in the field of other transport means, interior and exterior parts, preferably with a portable or mechanical function in the field of electrics, furniture, sport, mechanical engineering, the sanitary field and hygiene, medicine, energy- and drive technology, particularly preferably mobile telephones, smart phones, organizers, laptop computers, notebook computers, tablet computers, radios, cameras, clocks, calculators, devices for playing music or video, navigation devices, GPS devices, electronic picture frames, external hard disks and other electronic storage media, or for the production of mono- or multilayer films, containers or pipes.

19 Claims, No Drawings

POLYAMIDE MOULDING COMPOSITION, MOULDED ARTICLES PRODUCED THEREFROM AND ALSO USE OF THE POLYAMIDE MOULDING COMPOSITIONS

CROSS-REFERENCE TO A RELATED APPLICATION

This application claims the benefit of European Patent Application No. 14163210.9, filed Apr. 2, 2014, the disclosure of which is incorporated herein by reference.

BACKGROUND OF THE INVENTION

The invention relates to a polyamide moulding composition which comprises a partially aromatic polyamide and also a mixture of at least two UV absorbers. Likewise, the invention relates to moulded articles which comprise corresponding polyamide moulding compositions. The polyamide moulding compositions according to the invention are used as parts of electrical or electronic components or housings or housing components, in particular housings or housing parts for portable electronic devices, household appliances, household machines, devices and apparatus for telecommunication and consumer electronics, interior- and exterior parts in the automobile sector and in the field of other transport means, interior- and exterior parts, preferably with a portable or mechanical function in the field of electrics, furniture, sport, mechanical engineering, the sanitary field and hygiene, medicine, energy- and drive technology, particularly preferably mobile telephones, smart phones, organisers, laptop computers, notebook computers, tablet computers, radios, cameras, clocks, calculators, devices for playing music or video, navigation devices, GPS devices, electronic picture frames, external hard disks and other electronic storage media, or for the production of mono- or multilayer films, containers or pipes.

The use of UV absorbers for the production of transparent moulded articles is known from the state of the art.

From EP 1 992 659 A1, the addition of dibenzoylmethane compositions or aminohydroxybenzoylbenzoic acid esters as UV absorbers is known. Moulded parts which have a reduced transmission for light up to a wavelength of 400 nm are produced herefrom.

From WO 2007/087896 A1, polyamide moulding compositions are known for the production of transparent, hot steam-stabilisable moulded parts and extrudates, to which possibly a UV stabiliser can be added.

Starting herefrom, it was the object of the present invention to provide polyamide moulding compositions and moulded articles produced therefrom which, relative to the moulding compositions known from the state of the art, have improved yellowing properties.

This object is achieved by the polyamide moulding composition having the features of claim 1 and also the moulded articles or coatings produced herefrom having the features of claim 14. In claim 16, uses of the polyamide moulding composition according to the invention are mentioned. The further dependent claims reveal advantageous developments.

According to the invention, a polyamide moulding composition which comprises the following components is provided:

a) at least one partially aromatic polyamide producible by polycondensation a1) of at least one aromatic dicarboxylic acid and possibly at least one aliphatic dicarboxylic acid with 6 to 44 C atoms, a2) at least one aliphatic and/or cycloaliphatic diamine and a3) possibly at least one lactam with 4 to 15 C atoms and/or at least one α,ω-amino acid with 4 to 15 C atoms, b) at least one UV absorber from the group of N,N'-oxamides and also c) at least one UV absorber from the group of hydroxyphenyltriazines.

Surprisingly, by means of the polyamide moulding compositions according to the invention, a significant improvement in the yellowing properties of these moulding compositions could be achieved. By combining the mentioned UV stabilisers, a very low yellow index could be set, on the one hand, which also revealed only a slight increase in the case of a radiation- and temperature treatment. This was achieved by combining at least one UV absorber from the group of N,N'-oxamides and at least one UV absorber from the group of hydroxyphenyltriazines. The original yellow index (YI 1) of the polyamide moulding compositions according to the invention is thereby preferably at most 9, particularly preferred at most 7. Furthermore, the difference from the yellow index (YI 2) after 12 cycles of a radiation- and temperature treatment and the original yellow index (YI 1) is preferably at most 4, preferably at most 3 and particularly preferred at most 2. This hereby concerns a radiation- and temperature treatment which is structured as follows: the sheets for the measurement of the yellow index (YI 2) are irradiated per cycle for 4 hours at 60° C. with UVA at a wavelength of 340 nm and a spectral irradiation power of 0.63 W/m²/nm, and subsequently stored for 4 hours at 50° C. in an atmosphere saturated with moisture. The yellow index (YI 2) is measured on sheets which have passed through 12 of such cycles.

Preferably, the UV absorber is selected from the group of N,N'-oxamides of the general formula I

$R_1$ and $R_2$ being cyclic radicals, each individual ring comprising 4 to 6 C atoms and the cyclic radicals, independently of each other, being selected from the group consisting of homocyclic radicals, heterocyclic radicals, aromatic radicals or polycyclic radicals and the cyclic radicals possibly being substituted.

For particular preference, this hereby concerns a UV absorber from the group of oxalanilides of the general formula II

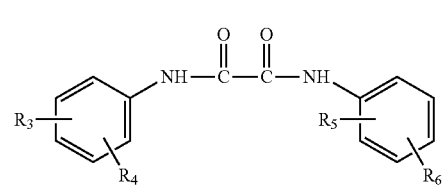

with
$R_3$, $R_4$, $R_5$ and $R_6$, independently, selected from the group consisting of H, hydroxy, phenyl, linear or branched alkoxy radicals with 1 to 12 C atoms, preferably 1 to 8 C atoms, particularly preferred 2 to 6 C atoms, linear or branched alkyl radicals with 1 to 12 C atoms, preferably 1 to 8 C atoms, particularly preferred 2 to 6 C atoms, in particular a composition of formula III:

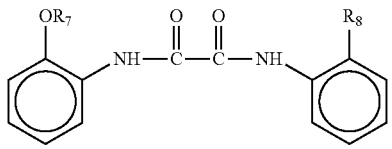

with
R$_7$ and R$_8$, independently of each other, selected from the group consisting of linear or branched alkyl radicals with 1 to 12 C atoms, preferably 1 to 8 C atoms, particularly preferred 2 to 6 C atoms.

The UV absorber from the group of hydroxyphenyltriazines is preferably a composition of the general formula IV

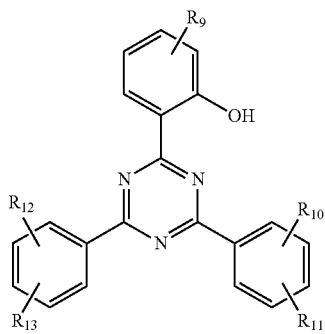

with
R$_9$, R$_{10}$, R$_{11}$, R$_{12}$ and R$_{13}$, independently, selected from the group consisting of H, hydroxy, phenyl, linear or branched alkoxy radicals with 1 to 12 C atoms, preferably 1 to 8 C atoms, particularly preferred 2 to 6 C atoms, linear or branched alkyl radicals with 1 to 12 C atoms, preferably 1 to 8 C atoms, particularly preferred 2 to 6 C atoms, in particular a composition of formula V:

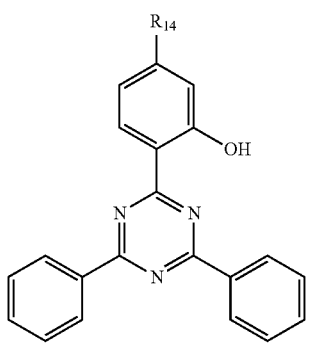

with
R$_{14}$=linear or branched alkoxy radicals with 1 to 12 C atoms, preferably 1 to 8 C atoms, particularly preferred 2 to 6 C atoms.

In a particularly preferred embodiment, the polyamide moulding composition according to the invention comprises only respectively one UV absorber from the group of N,N'-oxamides and from the group of hydroxyphenyltriazines.

Likewise, it is possible that the polyamide moulding composition according to the invention comprises further UV stabilisers. These can be selected in particular from the group of hydroxyphenylbenzotriazoles, dibenzoylmethanes, aminohydroxybenzoylbenzoic acid esters, hydroxybenzophenones, hindered amine light stabilisers (HALS), sterically discriminating phenols and mixtures hereof.

For the construction of the polyamides, preferably an aliphatic dicarboxylic acid is used, selected from the group consisting of succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, and mixtures hereof. As aromatic dicarboxylic acid, preferably isophthalic acid, terephthalic acid, naphthalenedicarboxylic acid and mixtures hereof are used.

It is hereby preferred in particular if merely a single aliphatic dicarboxylic acid is used.

There is understood, in the sense of the present invention, by an aliphatic diamine, also diamines which comprise aromatic structural units in which however the amino groups are crosslinked with an aliphatic carbon atom. Preferred representatives of this group are diamines MXD (meta-xylylenediamine), and PXD (para-xylylenediamine).

A particularly preferred further embodiment of the present invention provides that the single aliphatic dicarboxylic acid which is used in the production of the polyamide moulding compositions according to the invention is selected from the group consisting of adipic acid (6 carbon atoms), azelaic acid (9 carbon atoms), sebacic acid (10 carbon atoms), dodecanedioic acid (12 carbon atoms), tetradecanedioic acid (14 carbon atoms) and octadecanedioic acid (18 carbon atoms).

In a further embodiment, in the case of the partially aromatic polyamide moulding composition according to the invention, it is preferred in particular that the single aliphatic dicarboxylic acid which is used in the production of the polyamide moulding compositions according to the invention is dodecanedioic acid (12 carbon atoms).

For particular preference, for the formation of the polyamide for the dicarboxylic acids, mixtures of isophthalic acid and terephthalic acid or of isophthalic acid, terephthalic acid and dodecanedioic acid are used.

The aliphatic or cycloaliphatic diamine used for formation of the polyamide is preferably selected from the group consisting of ethylenediamine, butanediamine, pentanediamine, hexamethylenediamine, octanediamine, methyloctanediamine, nonanediamine, decanediamine, undecanediamine, dodecanediamine, trimethylhexamethylenediamine, methylpentanediamine, PACM (bis(aminocyclohexyl)methane) and its alkyl derivatives, bis(aminocyclohexyl)propane and its alkyl derivatives, isophoronediamine, norbornanediamine, bis(aminomethyl)norbornane, xylylenediamine, bis(aminomethyl)cyclohexane and its alkyl derivatives, TMACM (3,3',5,5' tetramethyl-4,4'-diaminocyclohexylmethane) and also mixtures hereof.

A further particularly preferred embodiment of the present invention provides that the diamine which is used in the production of the polyamide moulding compositions according to the invention is selected from the group consisting of MACM (3,3'-dimethyl-4,4'-diaminocyclohexylmethane), or a mixture of 1,6-hexanediamine, bis(3-methyl-4-aminocyclohexyl)methane and bis(4-aminocyclohexyl)methane.

Furthermore, for the construction of the polyamides, at least one lactam and/or at least one α,ω-amino acid can be used. Preferred lactams are lactams or α,ω-amino acids with 4, 6, 7, 8, 11 or 12 C atoms. These are the lactams pyrrolidin-2-one (4 C atoms), ε-caprolactam (6 C atoms), oenanthe lactam (7 C atoms), capryl lactam (8 C atoms), laurinlactam (12 C atoms) or α,ω-amino acids, 1,4-aminobutanoic acid, 1,6 aminohexanoic acid, 1,7-aminoheptanoic acid, 1,8-aminooctanoic acid, 1,11-aminoundecanoic acid and 1,12-aminododecanoic acid. The use of laurinlactam is particularly preferred here.

The partially aromatic polyamide according to the invention is preferably an amorphous or partially crystalline polyamide and in particular selected from the group consisting of PA 6I, PA 6I/6T, PA 10T/6T, PA 10T/612, PA MXD6, PA 6T/6I, PA 6T/66, PA 6I/6T/6NDA (NDA=naphthalenedicarboxylic acid), PA MXDI/6I, PA MXDI/XDT/6I/6T, PA 6T/6I/66, PA MXDI/12I, PA MXDI, PA NDT/INDT, PA MACMI/12, PA MACMT/12, PA MACMI/MACM12, PA MACMT/MACM12, PA MACMI/MACMNDC, PA MACMT/MACMNDC, PA MACMI/MACMT/12, PA 6I/MACMI/12, PA 6I/6T/MACMI/MACMT, PA 6I/6T/MACMI/MACMT/12, PA 6I/6T/MACMI/MACMT/MACM12/612, PA MACMI/MACMT/MACM12/12, PA MACMI/MACMT/MACM12, PA 6I/6T/6NDC/MACMI/MACMT/MACMNDC, the MACM being able to be replaced entirely or partially by PACM and/or the laurinlactam entirely or partially by caprolactam. Preferably, the partially aromatic polyamide is selected from the group consisting of PA 6I/6T, PA 10T/6T, PA 10T/612, PA 6T/6I, PA 6T/66, PA MACMI/12, PA MACMT/12, PA MACMI/MACM12, PA MACMT/MACM12, PA MACMI/MACMT/12, PA 6I/6T/MACMI/MACMT, PA 6I/6T/MACMI/MACMT/12, PA 6I/6T/MACMI/MACMT/PACMI/PACMT/12, PA MACMI/MACMT/MACM12, the laurinlactam being able to be replaced entirely or partially by caprolactam. Particularly preferred are the amorphous, partially aromatic polyamides PA MACMI/12, PA MACMI/MACM12, PA MACMT/MACM12, PA MACMI/MACMT/12, PA 6I/6T/MACMI/MACMT, PA 6I/6T/MACMI/MACMT/12, PA 6I/6T/MACMI/MACMT/PACMI/PACMT/12, PA MACMI/MACMT/MACM12 and very particularly preferred PA 6I/6T/MACMI/MACMT/PACMI/PACMT/12 and PA MACMI/MACMT/MACM12.

The spellings and abbreviations for polyamides and the monomers thereof are specified in the ISO Standard 1874-1:1992 (E).

MACM stands for the term bis(4-amino-3-methylcyclohexyl)-methane or 3,3'dimethyl-4-4'-diaminodicyclohexyl-methane (Cas No. 6864-37-5). PACM stands for the term bis(4-aminocyclohexyl)-methane or 4,4'-diaminodicyclohexylmethane (Cas No. 1761-71-3).

A further preferred embodiment provides that an amorphous partially aromatic polyamide is used as polyamide moulding composition, as a result of which improved colour brilliance in the case of pigmentations, increased scratch resistance and improved surface gloss, relative to the use of partially crystalline, partially aromatic polyamides or amorphous aliphatic polyamides, can be established.

Amorphous polyamides show, in the dynamic difference calorimetry (differential scanning calorimetry DSC) according to ISO 11357 at a heating rate of 20 K/min, a melting heat of at most 5 J/g, preferably of at most 3 J/g, particularly preferred of 0 to 1 J/g.

The relative viscosity of the amorphous, partially aromatic polyamides is 1.35 to 2.15, preferably 1.40 to 1.80, particularly preferred 1.45 to 1.70, measured with 0.5 g in 100 ml m-cresol at 20° C.

The relative viscosity of the partially crystalline, partially aromatic polyamides is 1.40 to 2.15, preferably 1.45 to 2.0, particularly preferred 1.50 to 1.90, measured with 0.5 g in 100 ml m-cresol at 20° C.

The moulding compositions according to the invention can comprise in addition further additives, selected in particular from the group consisting of condensation catalysts, chain regulators, de-foamers, inorganic stabilisers, organic stabilisers, lubricants, colourants, marking means, pigments, colourants, nucleation agents, antistatic agents, mould-release agents, optical brighteners, natural layer silicates, synthetic layer silicates, glass fibres and mixtures thereof.

The further additives can be contained preferably in a quantity of 0.01 to 6% by weight, preferably 0.05 to 6% by weight and particularly preferred 0.1 to 5% by weight, respectively relative to the total polyamide moulding composition.

The polyamide moulding composition according to the invention preferably has the following compositions.

a) 91.6 to 99.97% by weight, preferably 92.4% to 99.85% by weight and particularly preferred 93.4 to 99.7% by weight, of the at least one partially aromatic, amorphous polyamide, b) 0.01 to 1.2% by weight, preferably 0.05 to 0.8% by weight and particularly preferred 0.1 to 0.6% by weight, of the at least one UV stabiliser from the group of N,N'-oxamides, c) 0.01% to 1.2% by weight, preferably 0.05 to 0.8% by weight and particularly preferred 0.1 to 0.6% by weight of the at least one UV stabiliser from the group of hydroxyphenyltriazines, d) 0.01 to 6% by weight, preferably 0.05 to 6% by weight and particularly preferred 0.1 to 5% by weight, of further additives, components a) to d) adding up to 100% by weight.

In a particularly preferred embodiment of the polyamide moulding composition according to the invention, polyamide a) consists either of the partially aromatic, amorphous polyamide PA 6I/6T/MACMI/MACMT/PACMI/PACMT/12 or of the partially aromatic, amorphous polyamide PA MACMI/MACMT/MACM12 and also, as UV stabilisers, a composition according to formula III and a composition according to formula IV or V.

Furthermore, the polyamide moulding composition according to the invention comprises as dicarboxylic acid a1), preferably
- 0 to 40% by mol, preferably 0 to 30% by mol and particularly preferred 0 to 25% by mol, of the at least one aliphatic dicarboxylic acid, relative to 50% by mol of dicarboxylic acid, and
- 10 to 50% by mol, preferably 20 to 50% by mol and particularly preferred 25 to 50% by mol, of the at least one aromatic dicarboxylic acid, relative to 50% by mol of dicarboxylic acid.

Furthermore, the polyamide moulding composition according to the invention comprises as diamine a2), preferably
- 0 to 50% by mol, preferably 0 to 45% by mol and particularly preferred 35 to 42% by mol, of the at least one aliphatic diamine, relative to 50% by mol of diamine, and 50 to 0% by mol, preferably 50 to 5% by mol and particularly preferred 15 to 8% by mol, of the at least one cycloaliphatic diamine, relative to 50% by mol of diamine.

In a preferred embodiment, the polyamide moulding composition comprises, in addition to the diacid proportions a1) and the diamine proportions a2), a proportion a3) of at least one lactam with 4 to 15 C atoms and/or at least one α,ω-amino acid with 4 to 15 C atoms in quantities of 0 to 40% by mol, preferably 0 to 30% by mol, particularly preferred 2 to 30% by mol, relative to 100% by mol of polyamide a).

If the polyamides according to the invention comprise only diacids a1) and diamines a2), then the molar quantity data thereof are relative to 50% by mol of diamine and 50% by mol of diacid and the sum of the diamine- and diacid proportions produces 100% by mol for polyamide a) according to the invention.

If, in addition to diacids a1) and diamines a2), the polyamides according to the invention also comprise lactams or α,ω-amino acids a3), the indicated molar quantities of the various diacids a1) should be understood as the relative quantity thereof standardised to in total 50 mol proportions of diacid in polyamide a) and the indicated molar quantities of the various diamines a2) as the relative quantity thereof standardised to in total 50 mol proportions of diamine in polyamide a).

The system is illustrated with the two following composition examples:

For a polyamide PA MACMI/12 made of
20% by mol of lactam 12 (12),
40% by mol of isophthalic acid (I) and
40% by mol of bis(4-amino-3-methylcyclohexyl)-methane (MACM)
with the sum of the monomers 100% by mol,
there results for the composition the data:
MACM: 50% mol proportions (relative to 50 mol proportions of diamine in polyamide a)),
IPS: 50 mol proportions (relative to 50 mol proportions of diacid in polyamide a)) and
lactam 12: 20% by mol (relative to 100% by mol of polyamide a)).

For a polyamide a) PA MACMI/MACMT/12 with
20% by mol of lactam 12 (12),
30% by mol of isophthalic acid (I),
10% by mol of terephthalic acid (T) and
40% by mol of bis(4-amino-3-methylcyclohexyl)-methane (MACM)
with the sum of the monomers 100% by mol,
there results for the composition the data:
MACM: 50 mol proportions (relative to 50 mol proportions of diamine in polyamide a)),
IPS: 37.5 mol proportions (relative to 50 mol proportions of diacid in polyamide a))
TPS: 12.5 mol proportions (relative to 50 mol proportions of diacid in polyamide a))
and
lactam 12 20% by mol (relative to 100% by mol of polyamide a)).

In the case of the quantity data relating to the diacids a1) and diamines a2) of the polyamides according to the invention, it always applies that the sum of the molar proportions of the diamine is equal to the sum of the molar proportions of the dicarboxylic acids.

The previously mentioned quantity data with respect to the dicarboxylic acids—and also all further quantity data of the dicarboxylic acids or diamines—should thereby be understood such that a corresponding molar ratio of these educts used in the polycondensation are also found again in the polyamide moulding compositions produced in this way by polycondensation.

Likewise, moulded articles or coatings which comprise the previously described polyamide moulding compositions or consist hereof are provided.

The polyamide moulding compositions according to the invention are used for the production of moulded articles or coatings, in particular parts of an electrical or electronic component, of a housing or of a housing component, preferably housings or housing parts for portable electronic devices, household appliances, household machines, devices and apparatus for telecommunication and consumer electronics, interior and exterior parts in the automobile sector and in the field of other transport means, interior and exterior parts, preferably with a portable or mechanical function in the field of electrics, furniture, sport, mechanical engineering, the sanitary field and hygiene, medicine, energy- and drive technology, particularly preferred mobile telephones, smart phones, organisers, laptop computers, notebook computers, tablet computers, radios, cameras, clocks, calculators, playing devices for music or video, navigation devices, GPS devices, electronic picture frames, external hard disks and other electronic storage media, or for the production of mono- or multilayer films, containers or pipes. The mono- or multilayer films can be rear-sprayed subsequently with another material, preferably a polyamide, the film being able also to be deep-drawn before the spraying.

The subject according to the invention is intended to be described in more detail with reference to the subsequent examples, without wishing to restrict said subject to the specific embodiments shown here.

For production of the polyamide moulding composition, components a) to c) and possibly d) are mixed (compositioned) in the polymer melt on normal compositioning machines, such as e.g. single- or twin-shaft extruders or screw kneaders. The components are thereby metered individually into the feed or supplied in the form of a dry blend.

Components b), c) and/or d) can be introduced directly or in the form of master batches. The carrier material of the master batches concerns preferably a polyamide. Amongst the polyamides, there are suitable in particular PA 6, PA 11, PA 12, PA 6/12, PA MACM 12 or PA MACMI/12.

For the dry blend production, the dried granulates of polyamide a), components b) and c) and possibly further additives d) are mixed together. This mixture is homogenised by means of a tumble mixer, drum hoop mixer or tumbling dryer for 10-40 minutes. In order to avoid moisture absorption, this can be effected under a dry protective gas.

The compositioning is effected at set cylinder temperatures of 230° C. to 350° C. In front of the nozzle, a vacuum can be applied or atmospheric degassing can take place. The melt is discharged in strand form, cooled in the water bath at 10 to 80° C. and subsequently granulated. Also an underwater granulation can be implemented. The granulate is dried for 12 to 24 hours at 80 to 120° C. under nitrogen or in a vacuum to a water content of below 0.1% by weight.

Production of the test pieces made of the polyamide moulding compositions according to the invention:

The test pieces were produced on an injection moulding machine of the company Arburg, Model Allrounder 420C 1000-250. Rising cylinder temperatures of 230° C. to 295° C. were thereby used. The mould temperature was 80° C. In the case of the sheets for measuring the yellow indices, mirror-finished moulds were used.

The test pieces were used in the dry state; for this purpose, they were stored after the injection moulding for at least 48 h at room temperature in a dry environment, i.e. over silica gel.

The sheets for measuring the yellow index (YI 2) are irradiated per cycle for 4 hours at 60° C. with UVA at a wavelength of 340 nm and a spectral irradiation power of 0.63 W/m$^2$/nm and subsequently stored for 4 hours at 50° C. in an atmosphere saturated with moisture. The yellow index (YI 2) is measured on sheets which have passed through 12 of such cycles.

Test pieces and measuring methods used in this application:
Yellow index
ASTM E313
sheet 60×60×1 mm
temperature 23° C.
Modulus of elasticity in tension:
ISO 527 with a tensile speed of 1 mm/min
ISO test bar, standard: ISO/CD 3167, type A1, 170×20/10×4 mm, temperature 23° C.
Tearing strength and breaking elongation:
ISO 527 with a tensile speed of 50 mm/min with non-reinforced and 5 mm/min with reinforced materials
ISO test bar, standard: ISO/CD 3167, type A1 170×20/10×4 mm, temperature 23° C.
Impact strength according to Charpy:
ISO 179/*eU
ISO test bar, standard: ISO/CD 3167, type B1, 80×10×4 mm, temperature 23° C.
*1=not instrumented, 2=instrumented
Notch impact strength according to Charpy;
ISO 179/*eA
ISO test bar, standard: ISO CD 3167, type B1, 80×10×4 mm, temperature 23° C.
*1=not instrumented, 2=instrumented
Relative viscosity
ISO 307
granulate
0.5 g in 100 ml m-cresol
temperature 20° C.
calculation of the relative viscosity (RV) according to RV=t/t$_0$ following section 11 of the standard.
Melting heat:
ISO standard 11357
granulate
Differential scanning calorimetry (DSC) was implemented at a heating rate of 20 K/min.

Table 1 shows the used polyamide materials which were produced at EMS-Chemie AG.

TABLE 1

| Material | Description | Manufacturer |
| --- | --- | --- |
| polyamide A1 | amorphous polyamide 6I/6T/MACMI/MACMT/PACMI/PACMT/12 made of 1,6 hexanediamine (39.0% by mol), bis(3-methyl-4-amino-cyclohexyl)methane (7.1% by mol), bis(4-aminocyclohexyl)methane (2.5% by mol), isophthalic acid (24.3% by mol), terephthalic acid (24.3% by mol) and laurinlactam (2.8% by mol) RV 1.62 (measured with 0.5 g in 100 ml m-cresol at 20° C.) glass transition temperature 159° C. | EMS-CHEMIE AG Switzerland |
| polyamide A2 | amorphous polyamide MACMI/MACMT/MACM12 made of bis(3-methyl-4-aminocyclohexyl)methane (50% by mol), isophthalic acid (13.5% by mol), terephthalic acid (13.5% by mol) and dodecanedioic acid (23% by mol) RV 1.54 (measured with 0.5 g in 100 ml m-cresol at 20° C.) glass transition temperature 200° C. | EMS-CHEMIE AG, Switzerland |

RV relative viscosity

Table 2 shows the tested, commercially available UV stabilisers and heat stabilisers.

TABLE 2

| Material | Chemical term | Melting point [° C.] | Trade name | Manufacturer |
| --- | --- | --- | --- | --- |
| UV stabiliser B1 | N-(2-ethoxyphenyl)-N'-(2-ethylphenyl)oxamide | 126 | Tinuvin 312 | BASF, Switzerland |
| UV stabiliser B2 | 2-(4,6-diphenyl-1,3,5-triazin-2yl)-5-hexyloxyphenol | 149 | Tinuvin 1577 | BASF, Switzerland |
| UV stabiliser B3 | 2-(4,6-diaryl-1,3,5-triazin-2yl-5-(alkoxy substituted)-phenol | 125 | Tinuvin 1600 | BASF, Switzerland |
| UV stabiliser B4 | 2-tert-butyl-6-(5-chlorobenzotriazol-2-yl)-4-methylphenol | 138 | Tinuvin 326 | BASF, Switzerland |
| UV stabiliser B5 | 2-(benzotriazol-2-yl)-4,6-bis(2-phenylpropan-2-yl)phenol | 139 | Tinuvin 234 | BASF, Switzerland |
| UV stabiliser B6 | bis(2,2,6,6,-tetramethyl-4-piperidyl)sebacate | 83 | Tinuvin 770 DF | BASF, Switzerland |
| UV stabiliser B7 | 2-(2-hydroxyphenyl)-benzotriazole derivative | 134 | Tinuvin Carboprotect | BASF, Switzerland |
| UV stabiliser B8 | 2-(benzotriazol-2-yl)-4,6-bis(2-methylbutane-2-yl)phenol | 84 | Tinuvin 328 | BASF, Switzerland |
| UV stabiliser B9 | 2-(benzotriazol-2-yl)-6-[[3-(benzotriazol-2-yl)-2-hydroxy-5-(2,4,4-trimethylpentan-2-yl)phenyl]methyl]-4-(2,4,4-trimethylpentan-2-yl)phenol | 198 | Tinuvin 360 | BASF, Switzerland |
| UV stabiliser B10 | poly[[6-[(1,1,3,3,tetramethylbutyl)amino]-1,3,5-triazin-2,4-diyl][(2,2,6,6-tetramethyl-4-piperidinyl)imino]-1,6-hexandiyl[(2,2,6,6-tetramethyl-4-piperidinyl)imino]]) | | Chimasorb 944 FD | BASF, Switzerland |

TABLE 2-continued

| Material | Chemical term | Melting point [° C.] | Trade name | Manufacturer |
|---|---|---|---|---|
| UV stabiliser B11 | 1-(4-methoxyphenyl)-3-(4-tert-butylphenyl)propan-1,3-dion | 82 | Parsol 1789 | DSM Netherlands |
| heat stabiliser 1 | N,N'-hexan-1,6-diylbis[3-(3,5-di-tert-butyl-4-hydroxyphenyl-propionamide | 159 | Irganox 1098 | BASF, Switzerland |
| heat stabiliser 2 | tris(2,4-ditert-butylphenyl)phosphite | 183 | Hostanox PAR 24 | BASF, Switzerland |

In Table 3, examples according to the invention with the respective compositions and also the test results with respect to the yellow index are presented. The yellow index (YI 1) thereby represents the original yellow index of the polyamide moulding composition, the yellow index (YI 2) shows the yellow index after 12 cycles of the radiation- and temperature treatment. The value (YI 2)–(YI 1) in the last line of the table represents the difference of the yellow index after the radiation- and temperature treatment and the original yellow index (YI 1), i.e. the rise in yellow index.

TABLE 3

| Components | Unit | Examples |  |  |  |
|---|---|---|---|---|---|
|  |  | 1 | 2 | 3 | 4 |
| polyamide A1 | % by wt. | 99.2 | 98.6 | 99.2 | — |
| polyamide A2 | % by wt. | — | — | — | 99.2 |
| UV stabiliser B1 | % by wt. | 0.2 | 0.35 | 0.2 | 0.2 |
| UV stabiliser B2 | % by wt. | 0.2 | 0.35 | — | 0.2 |
| UV stabiliser B3 | % by wt. | — | — | 0.2 | — |
| heat stabiliser 1 | % by wt. | 0.2 | 0.35 | 0.2 | 0.2 |
| heat stabiliser 2 | % by wt. | 0.2 | 0.35 | 0.2 | 0.2 |
| Tests |  |  |  |  |  |
| yellow index (YI 1) | original | 5.4 | 6.4 | 6.8 | 4.8 |
| yellow index (YI 2) | 12 cycles | 7.3 | 8.1 | 8.6 | 5.6 |
| (YI 2) – (YI 1) | — | 1.9 | 1.7 | 1.8 | 0.8 |
| modulus of elasticity in tension | MPa | 2700 | 2720 | — | 2130 |
| tearing strength | MPa | 78 | 80 | — | 65 |
| breaking elongation | % | 90 | 87 | — | 35 |

TABLE 3-continued

| Components | Unit | Examples |  |  |  |
|---|---|---|---|---|---|
|  |  | 1 | 2 | 3 | 4 |
| impact strength Charpy 23° C. | kJ/m2 | wb | wb | — | wb |
| notch impact strength Charpy 23° C. | kJ/m2 | 11 | 11 | — | 9 | wb without breakage

In Table 3, three examples according to the invention with polyamide A1 are represented. Examples 1 and 2 are thereby based on a combination with the UV stabilisers B1 and B2 whilst example 3 contains a combination of UV stabilisers B1 and B3. In example 4, a composition based on polyamide A2 with the UV stabilisers B1 and B2 has been used. Furthermore, all the examples 1 to 4 contain the heat stabilisers 1 and 2 listed in Table 2.

It is shown from the measurements of the yellow index (YI 1) that, in all four compositions, a low original yellow index of at most 6.8 is present. After the twelve cycles of the radiation- and temperature treatment, the yellow index (YI 2) rises to a value of at most 8.6 (example 3). Hence all the examples show a rise in yellow index after the radiation- and temperature treatment of less than 2.

In Table 4, comparative examples 4 to 12 are represented with the respective compositions of the polyamide moulding composition and the test results with respect to the yellow index analogously to Table 3.

TABLE 4

| | Unit | Comparative examples | | | | | | | | |
|---|---|---|---|---|---|---|---|---|---|---|
| | | 4 | 5 | 6 | 7 | 8 | 9 | 10 | 11 | 12 |
| Components | | | | | | | | | | |
| polyamide A1 | % by wt. | 99.6 | 99.4 | 99.4 | 99.2 | 99.4 | 99.2 | 99.4 | 99.2 | 99.4 |
| UV stabiliser B1 | % by wt. | — | 0.2 | — | 0.2 | — | 0.2 | — | 0.2 | — |
| UV stabiliser B2 | % by wt. | — | — | 0.2 | — | — | — | — | — | — |
| UV stabiliser B4 | % by wt. | — | — | — | 0.2 | 0.2 | — | — | — | — |
| UV stabiliser B5 | % by wt. | — | — | — | — | — | 0.2 | 0.2 | — | — |
| UV stabiliser B6 | % by wt. | — | — | — | — | — | — | — | 0.2 | 0.2 |
| heat stabiliser 1 | % by wt. | 0.2 | 0.2 | 0.2 | 0.2 | 0.2 | 0.2 | 0.2 | 0.2 | 0.2 |
| heat stabiliser 2 | % by wt. | 0.2 | 0.2 | 0.2 | 0.2 | 0.2 | 0.2 | 0.2 | 0.2 | 0.2 |
| Tests | | | | | | | | | | |
| yellow index (YI 1) | original | 2.4 | 4.1 | 5.4 | 17.6 | 18.3 | 9.8 | 12.2 | 5.7 | 5.2 |
| yellow index (YI 2) | 12 cycles | 18.0 | 16.5 | 10.7 | 24.0 | 24.0 | 15.6 | 15.9 | 16.8 | 17.6 |
| (YI 2) – (YI 1) | — | 15.6 | 12.4 | 5.3 | 6.4 | 5.7 | 5.8 | 5.7 | 11.1 | 12.4 |
| modulus of elasticity in tension | MPa | 2700 | — | — | — | — | — | — | — | — |
| tearing strength | MPa | 85 | — | — | — | — | — | — | — | — |
| breaking elongation | % | 90 | — | — | — | — | — | — | — | — |

TABLE 4-continued

|  | Unit | Comparative examples | | | | | | | | |
|---|---|---|---|---|---|---|---|---|---|---|
|  |  | 4 | 5 | 6 | 7 | 8 | 9 | 10 | 11 | 12 |
| impact strength Charpy 23° C. | kJ/m2 | wb | — | — | — | — | — | — | — | — |
| notch impact strength Charpy 23° C. | kJ/m2 | 12 | — | — | — | — | — | — | — | — | wb without breakage

All of the comparative examples 4 to 12 are based on polyamide A1 and differ merely in the added UV stabilisers. Thus comparative example 4 is free of any UV stabilisers whilst, in comparative example 5, only UV stabiliser B1 alone and in comparative example 6 UV stabiliser B2 alone were used. The further comparative examples 7-12 then show combinations of two UV stabilisers, as are listed in Table 2.

For comparative examples 4 and 5, it can be established that the original yellow index (YI 1) is low, the subsequent radiation- and temperature treatment however leads to an extreme rise in the yellow index. The comparative example 6 in fact shows a lower rise which is however nevertheless significantly above the rise in yellow index in the examples according to the invention. Also the further comparative examples 7-12 show either a significantly higher original value for the yellow index (YI 1, comparative examples 7 to 10) or a significantly higher rise in the yellow index during the radiation- and temperature treatment (comparative examples 11 and 12).

In Table 5, further comparative examples 18 to 22 are presented with reference to the compositions of the polyamide moulding composition and the test results with respect to the yellow index.

TABLE 5

|  | Unit | Comparative examples | | | | | | | | | |
|---|---|---|---|---|---|---|---|---|---|---|---|
|  |  | 13 | 14 | 15 | 16 | 17 | 18 | 19 | 20 | 21 | 22 |
| Components |  |  |  |  |  |  |  |  |  |  |  |
| polyamide A1 | % by wt. | 99.4 | 99.2 | 99.2 | 99.4 | 99.2 | 99.4 | 99.2 | 99.2 | 99.4 | — |
| polyamide A2 | % by wt. | — | — | — | — | — | — | — | — | — | 99.6 |
| UV stabiliser B1 | % by wt. | — | 0.2 | 0.2 | — | 0.2 | — | 0.2 | 0.2 | — | — |
| UV stabiliser B7 | % by wt. | 0.2 | — | — | — | — | — | — | — | — | — |
| UV stabiliser B8 | % by wt. | — | 0.2 | — | — | — | — | — | — | — | — |
| UV stabiliser B9 | % by wt. | — | — | 0.2 | 0.2 | — | — | — | — | — | — |
| UV stabiliser B10 | % by wt. | — | — | — | — | 0.2 | 0.2 | — | — | — | — |
| UV stabiliser B11 | % by wt. | — | — | — | — | — | — | 0.2 | 0.2 | 0.2 | — |
| heat stabiliser 1 | % by wt. | 0.2 | 0.2 | 0.2 | 0.2 | 0.2 | 0.2 | 0.2 | 0.2 | 0.2 | 0.2 |
| heat stabiliser 2 | % by wt. | 0.2 | 0.2 | 0.2 | 0.2 | 0.2 | 0.2 | 0.2 | 0.2 | 0.2 | 0.2 |
| Tests |  |  |  |  |  |  |  |  |  |  |  |
| yellow index (YI 1) | original | 38.6 | 10.5 | 14.5 | 14.4 | 6.2 | 5.5 | 6.7 | 6.6 | 5.3 | 1.9 |
| yellow index (YI 2) | 12 cycles | 51.2 | 16.0 | 19.6 | 20.2 | 17.8 | 20.7 | 18.8 | 22.0 | 23.9 | 10.3 |
| (YI 2) − (YI 1) | — | 12.6 | 5.5 | 5.1 | 5.8 | 11.6 | 15.2 | 12.1 | 15.4 | 18.6 | 8.4 |
| modulus of elasticity in tension | MPa | — | — | — | — | — | — | — | — | — | 2000 |
| tearing strength | MPa | — | — | — | — | — | — | — | — | — | 65 |
| breaking elongation | % | — | — | — | — | — | — | — | — | — | 40 |
| impact strength Charpy 23° C. | kJ/m2 | — | — | — | — | — | — | — | — | — | wb |
| notch impact strength Charpy 23° C. | kJ/m2 | — | — | — | — | — | — | — | — | — | 9 | wb without breakage

In Table 5, comparative examples 13 to 21 are based on polyamide A1, whilst polyamide A2 was used for comparative example 22. In examples 13 and 18, a single UV stabiliser (UV stabiliser B7 or B10) was used. The comparative examples 14 to 17 and also 19 to 21 show combinations of two UV stabilisers. In comparative example 22, the addition of a UV stabiliser was dispensed with.

It can be deduced from the table that the original yellow index (YI 1) for comparative examples 13 to 16 is very high and also the rise in yellow index during the radiation- and temperature treatment is significantly above the examples according to the invention. Comparative examples 17 to 21 in fact show a lower original yellow index (YI 1), here however the rise in yellow index during the radiation- and temperature treatment is untenably high. Comparative example 22 based on polyamide A2 shows a low original yellow index (YI 1), however the result here is a very steep rise in yellow index during the radiation- and temperature treatment.

From the yellow index tests, it emerges hence that the polyamide moulding compositions according to the invention show a significantly improved yellowing resistance, in particular with respect to yellowing during the radiation- and temperature treatment.

The invention claimed is:

1. A polyamide moulding composition comprising:
    a) 91.6 to 99.97% by weight of at least one partially aromatic amorphous polyamide producible by polycondensation of
        a1) at least one aromatic dicarboxylic acid and optionally at least one aliphatic dicarboxylic acid with 6 to 44 C atoms,
        a2) at least one aliphatic and/or cycloaliphatic diamine and
        a3) optionally at least one lactam with 4 to 15 C atoms and/or at least one α,ω-amino acid with 4 to 15 C atoms,
    b) at least one UV absorber from the group of N,N'-oxamides,
    c) at least one UV absorber from the group of hydroxyphenyltriazines, and
    d) one or more additives selected from the group consisting of condensation catalysts, chain regulators, defoamers, inorganic stabilizers, organic stabilizers, lubricants, colourants, marking means, pigments, nucleation agents, antistatic agents, mould-release agents, optical brighteners, natural layer silicates, synthetic layer silicates, glass fibres, and mixtures thereof, wherein the difference between the yellow index (YI 2) after 12 cycles of a radiation- and temperature treatment and the original yellow index (YI 1) is at most 4.

2. The polyamide moulding composition according to claim 1, wherein the at least one UV absorber under b) is selected from the group consisting of N,N'-oxamides of the general formula (I)

$R_1$ and $R_2$ being cyclic radicals, each individual ring comprising 4 to 6 C atoms and the cyclic radicals, independently of each other, being selected from the group consisting of homocyclic radicals, heterocyclic radicals, aromatic radicals and polycyclic radicals and the cyclic radicals optionally being substituted.

3. The polyamide moulding composition according to claim 1, wherein the at least one UV absorber under b) is selected from the group consisting of oxalanilides of the general formula (II)

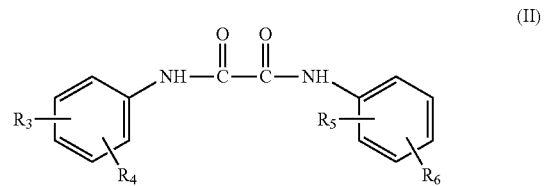

with
$R_3$, $R_4$, $R_5$ and $R_6$, independently, selected from the group consisting of H, hydroxy, phenyl, linear or branched alkoxy radicals with 1 to 12 C atoms, and linear or branched alkyl radicals with 1 to 12 C atoms, and a compound of formula (III)

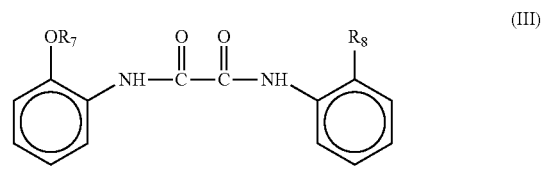

with
$R_7$ and $R_8$, independently of each other, selected from the group consisting of linear and branched alkyl radicals with 1 to 12 C atoms.

4. The polyamide moulding composition according to claim 1, wherein the UV absorber under c) is a compound of the general formula (IV)

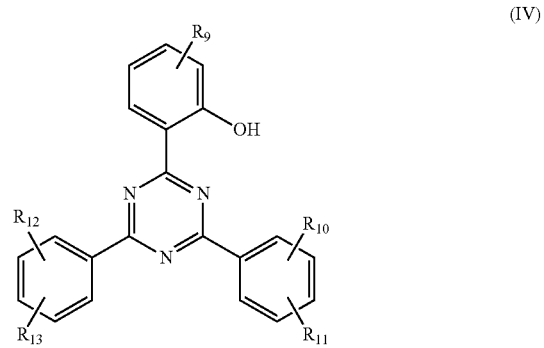

with
$R_9$, $R_{10}$, $R_{11}$, $R_{12}$ and $R_{13}$, independently, selected from the group consisting of H, hydroxy, phenyl, linear and branched alkoxy radicals with 1 to 12 C atoms, linear and branched alkyl radicals with 1 to 12 C atoms, and a compound of formula (V):

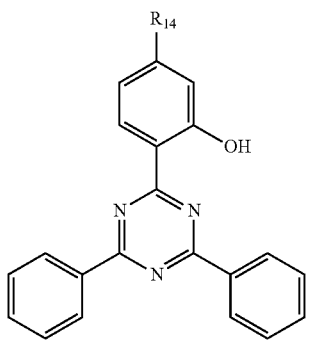

(V)

with
R$_{14}$=linear or branched alkoxy radicals with 1 to 12 C atoms.

5. The polyamide moulding composition according to claim 1, wherein the at least one aliphatic dicarboxylic acid is selected from the group consisting of succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, and mixtures thereof, and/or the at least one aromatic dicarboxylic acid is selected from the group consisting of isophthalic acid, terephthalic acid, naphthalenedicarboxylic acid and mixtures thereof.

6. The polyamide moulding composition according to claim 1, wherein the at least one aliphatic or cycloaliphatic diamine is selected from the group consisting of ethylenediamine, butanediamine, pentanediamine, hexamethylenediamine, octanediamine, methyloctanediamine, nonanediamine, decanediamine, undecanediamine, dodecanediamine, trimethylhexamethylenediamine, methylpentanediamine, bis(aminocyclohexyl)methane and its alkyl derivatives, bis(aminocyclohexyl)propane and its alkyl derivatives, isophoronediamine, norbornanediamine, bis(aminomethyl)norbornane, xylylenediamine, bis(aminomethyl)cyclohexane and its alkyl derivatives and mixtures thereof.

7. The polyamide moulding composition according to claim 1, wherein the at least one partially aromatic amorphous polyamide is selected from the group consisting of PA 6I, PA 6I/6T, PA 10T/6T PA 10T/612, PA MXD6, PA 6T/6I, PA 6T/66, PA 6I/6T/6NDC, PA MXDI/6I, PA 6T/6I/66, PA MXDI/MDT/6I/6T, PA MXDI/12I, PA MXDI, PA NDT/INDT, PA MACMI/12, PA MACMT/12, PA MACMI/MACM12, PA MACMT/MACM12, PA MACMI/MACMNDA, PA MACMT/MACMNDA, PA MACMI/MACMT/12, PA 6I/MACMI/12, PA 6I/6T/MACMI/MACMT, PA 6I/6T/MACMI/MACMT/12, PA 6I/6T/MACMI/MACMT/MACM12/612, PA MACMI/MACMT/MACM12/12, PA MACMI/MACMT/MACM12, and PA 6I/6T/6NDC/MACMI/MACMT/MACMNDC, the MACM being able to be replaced entirely or partially by PACM and/or the laurinlactam entirely or partially by caprolactam.

8. The polyamide moulding composition according to claim 1, wherein the polyamide moulding composition includes a further polyamide, the further polyamide being present in a proportion of at most 30% by weight, and being selected from the group consisting of PA 6, PA 66, PA 69, PA 610, PA 612, PA 614, PA 618, PA 1010, PA 1212, PA 6/66/12, PA 6/66, PA 6/12, PA 11, PA 12, PA MACMI2, PA MACMI4, PA MACM18, PA PACM 12, PA PACMI4, PA PACM 18, polyether amides, polyether ester amides, and blends and alloys thereof.

9. The polyamide moulding composition according to claim 1, wherein the polyamide moulding composition has the following composition:
a) 91.6 to 99.97% by weight of the at least one partially aromatic amorphous polyamide,
b) 0.01 to 1.2% by weight of the at least one UV stabiliser from the group of N,N-oxamides,
c) 0.01% to 1.2% by weight of the at least one UV stabiliser from the group of hydroxyphenyltriazines, and
d) 0.01 to 6% by weight of said one or more additives, components a) to d) adding up to 100% by weight.

10. The polyamide moulding composition according to claim 1, wherein the polyamide moulding composition comprises
0 to 40% by mol of the at least one aliphatic dicarboxylic acid, relative to 50% by mol of dicarboxylic acid, and
10 to 50% by mol of the at least one aromatic dicarboxylic acid, relative to 50% by mol of dicarboxylic acid.

11. The polyamide moulding composition according to claim 1, wherein the polyamide moulding composition comprises
0 to 50% by mol of the at least one aliphatic diamine, relative to 50% by mol of diamine, and
50 to 0% by mol of the at least one cycloaliphatic diamine, relative to 50% by mol of diamine.

12. The polyamide moulding composition according to claim 1, wherein the polyamide moulding composition comprises 0 to 40% by mol, relative to 100% by mol of polyamide a) of a lactam with 4 to 15 C atoms and/or at least one α,ω-amino acid with 4 to 15 C atoms.

13. A moulded article or coating comprising or consisting of a polyamide moulding composition according to claim 1.

14. The moulded article according to claim 13, which is part of an electrical or electronic component, a housing or of a housing component, devices and apparatus for telecommunication and consumer electronics, interior and exterior parts of an automobile, interior and exterior parts, of electrics, furniture, sport, mechanical engineering, the sanitary field and hygiene, medicine, energy- and drive technology, mono- or multilayer films, containers or pipes.

15. A method for the production of a moulded article, coating, or film comprising moulding the article, coating, or film by utilizing the polyamide moulding composition in accordance with claim 1.

16. The polyamide moulding composition according to claim 10, wherein the polyamide moulding composition has the following composition:
a) 92.4 to 99.85% by weight of the at least one partially aromatic amorphous polyamide,
b) 0.05 to 0.8% by weight of the at least one UV stabiliser from the group of N,N'-oxamides,
c) 0.05% to 0.8% by weight of the at least one UV stabiliser from the group of hydroxyphenyltriazines, and
d) 0.05 to 6% by weight of said one or more additives, components a) to d) adding up to 100% by weight.

17. The polyamide moulding composition according to claim 10, wherein the polyamide moulding composition comprises
0 to 30% by mol of the at least one aliphatic dicarboxylic acid, relative to 50% by mol of dicarboxylic acid, and 20 to 50% by mol of the at least one aromatic dicarboxylic acid, relative to 50% by mol of dicarboxylic acid.

18. The polyamide moulding composition according to claim 11, wherein the polyamide moulding composition comprises 0 to 45% by mol of the at least one aliphatic diamine, relative to 50% by mol of diamine, and 50 to 5% by mol of the at least one cycloaliphatic diamine, relative to 50% by mol of diamine.

19. The polyamide moulding composition according to claim 12, wherein the polyamide moulding composition comprises 0 to 30% by mol, relative to 100% by mol of polyamide a) of a lactam with 4 to 15 C atoms and/or at least one $\alpha,\omega$-amino acid with 4 to 15 C atoms.

* * * * *

UNITED STATES PATENT AND TRADEMARK OFFICE
CERTIFICATE OF CORRECTION

PATENT NO. : 9,644,081 B2
APPLICATION NO. : 14/663105
DATED : May 9, 2017
INVENTOR(S) : Aepli et al.

Page 1 of 1

It is certified that error appears in the above-identified patent and that said Letters Patent is hereby corrected as shown below:

In the Claims

Claim 8, Line 7, "MACMI2, PA MACMI4" should read --MACM12, PA MACM14--.

Claim 8, Line 8, "PACMI4" should read --PACM14--.

Claim 9, Line 7, "N,N-oxamides" should read --N,N'-oxamides--.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*